US012158714B2

(12) United States Patent
Hori et al.

(10) Patent No.: US 12,158,714 B2
(45) Date of Patent: Dec. 3, 2024

(54) IMAGE FORMING APPARATUS

(71) Applicant: CANON KABUSHIKI KAISHA, Tokyo (JP)

(72) Inventors: Yuichiro Hori, Kanagawa (JP); Nozomu Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/935,512

(22) Filed: Sep. 26, 2022

(65) Prior Publication Data

US 2023/0103919 A1 Apr. 6, 2023

(30) Foreign Application Priority Data

Sep. 27, 2021 (JP) ................................ 2021-156316

(51) Int. Cl.
*G03G 15/20* (2006.01)
*G03G 21/20* (2006.01)

(52) U.S. Cl.
CPC ......... *G03G 15/2039* (2013.01); *G03G 21/20* (2013.01); *G03G 2215/00084* (2013.01)

(58) Field of Classification Search
CPC ..................... G03G 21/20; G03G 2215/00084
See application file for complete search history.

(56) References Cited

U.S. PATENT DOCUMENTS

| | | | | |
|---|---|---|---|---|
| 2012/0230711 | A1* | 9/2012 | Shiori | G03G 21/20 399/44 |
| 2014/0233972 | A1* | 8/2014 | Sugiyama | G03G 15/55 399/44 |
| 2014/0348522 | A1* | 11/2014 | Tomono | G03G 15/50 399/90 |
| 2019/0227472 | A1* | 7/2019 | Hara | G03G 15/5045 |

FOREIGN PATENT DOCUMENTS

| | | | |
|---|---|---|---|
| JP | 2010134407 | A | 6/2010 |
| JP | 2013088548 | A | 5/2013 |
| JP | 2016224374 | A | 12/2016 |
| JP | 2019070678 | A | 5/2019 |

* cited by examiner

*Primary Examiner* — Sevan A Aydin
(74) *Attorney, Agent, or Firm* — Canon U.S.A., Inc. IP Division

(57) ABSTRACT

An image forming apparatus configured to form an image on a recording material includes a detection unit configured to detect a temperature of a first member, and an estimation unit configured to estimate a temperature of a second member, which is different from the first member. The estimation unit is configured to estimate, based on the temperature of the second member estimated by the estimation unit at a first timing, which is a timing before the image forming apparatus is powered off, the temperature of the first member detected by the detection unit at a second timing, which is a timing after the image forming apparatus is powered on, and information representing an operation history of the image forming apparatus until when the image forming apparatus is powered off, the temperature of the second member at the second timing.

19 Claims, 9 Drawing Sheets

IMAGE FORMING APPARATUS

BACKGROUND

Field of the Disclosure

The present disclosure relates to control for improving the accuracy with which the temperature of an image forming apparatus is estimated.

Description of the Related Art

In an image forming apparatus using electrophotography technology, temperatures of various portions in the image forming apparatus (hereinafter referred to as "internal temperatures") increase due to, for example, effects of heat emitted from a fixing device during printing and also conveyance of a heated recording material and heat generated by electric elements. An excessive increase in internal temperature may result in a defective image. However, it is difficult, in terms of cost and space, to arrange temperature sensors at all portions that are likely to be affected by heat. Thus, a method has already been known in which a controller provided in an image forming apparatus estimates an internal temperature of a target portion. The controller controls the operation of the image forming apparatus such that the estimated temperature does not exceed a preset temperature.

In Japanese Patent Laid-Open No. 2010-134407, a method is described in which a controller measures with high accuracy the temperature of a development motor for driving a development roller without directly detecting the temperature of the development motor. In Japanese Patent Laid-Open No. 2010-134407, on the basis of changes in the temperature of a fixing thermistor from when the power is turned off to when the power is turned on, the controller estimates a time elapsed in a state in which power supply to the image forming apparatus is stopped. The temperature of the development motor at the time when power is restored is estimated by the controller from the estimated elapsed time and an estimated temperature of the development motor stored in a storage unit immediately before the power is turned off.

Regarding the method of Japanese Patent Laid-Open No. 2010-134407, the accuracy with which the temperature of a target portion at the time when power is restored is estimated was sufficient at that time. However, the accuracy with which the temperature is estimated has been desired to be higher in recent years.

SUMMARY

The present disclosure provides an image forming apparatus that improves the accuracy with which the temperature of a target portion of the image forming apparatus at power on is estimated.

The present disclosure provides an image forming apparatus configured to form an image on a recording material. The image forming apparatus includes a detection unit configured to detect a temperature of a first member, and an estimation unit configured to estimate a temperature of a second member, which is different from the first member. The estimation unit is configured to estimate, based on the temperature of the second member estimated by the estimation unit at a first timing, which is a timing before the image forming apparatus is powered off, the temperature of the first member detected by the detection unit at a second timing, which is a timing after the image forming apparatus is powered on, and information representing an operation history of the image forming apparatus until when the image forming apparatus is powered off, the temperature of the second member at the second timing.

Further features of the present disclosure will become apparent from the following description of exemplary embodiments with reference to the attached drawings.

DESCRIPTION OF THE EMBODIMENTS

Exemplary embodiments of the present disclosure will be descried in detail below. Note that a plurality of exemplary embodiments below are just examples, and the scope of the present disclosure is not limited only to the configurations of the exemplary embodiments.

First Exemplary Embodiment

[Description of Image Forming Apparatus]

Figure 1:
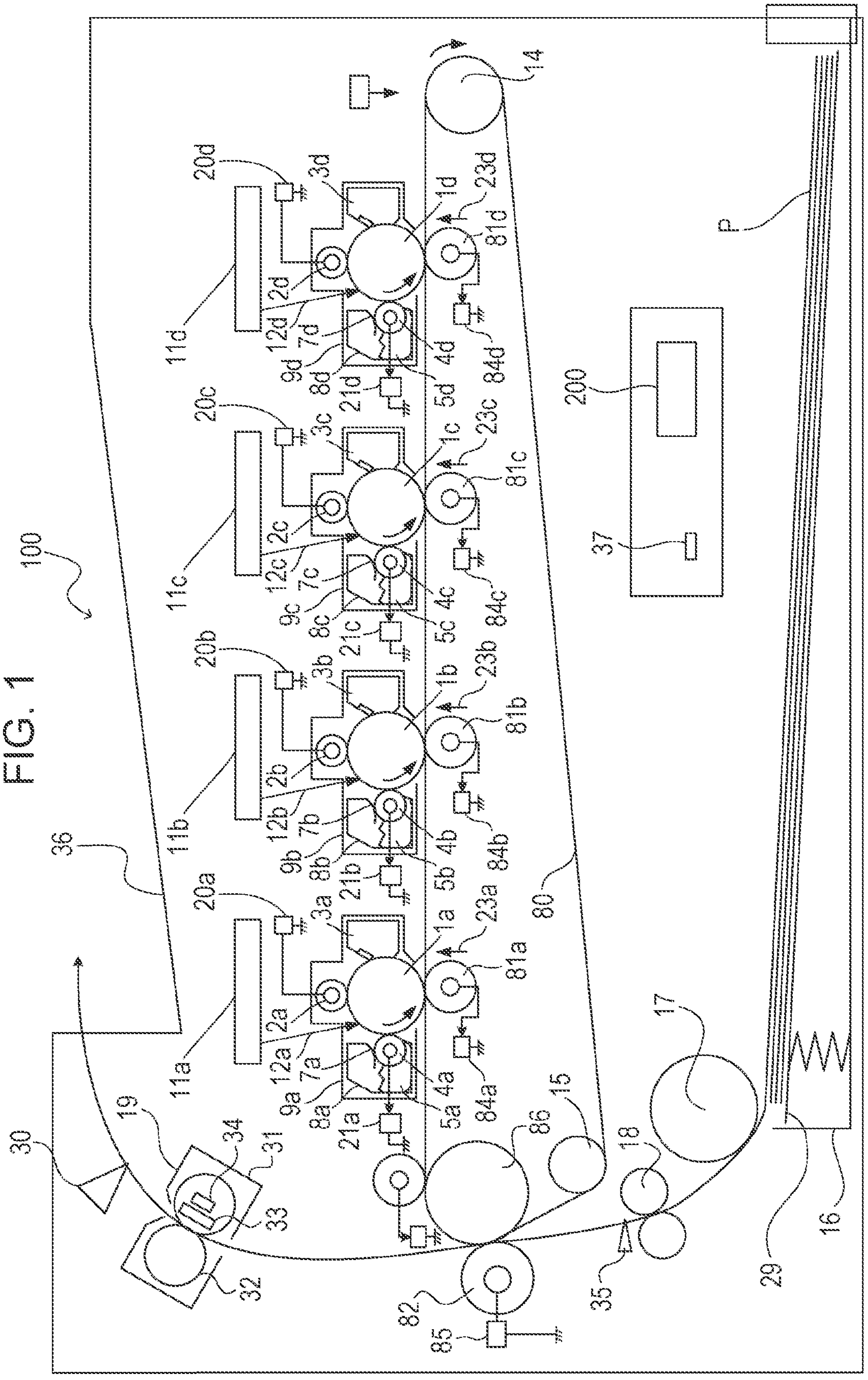
FIG. 1 is a schematic diagram of the configuration of an image forming apparatus.

FIG. 1 is a schematic diagram of the configuration of an image forming apparatus 100 according to the present exemplary embodiment. Note that, in the following description, alphabets a, b, c, and d at the ends of reference numerals correspond to yellow (Y), magenta (M), cyan (C), and black (Bk), respectively. Members having reference numerals ending with the alphabets a, b, c, and d are members related to formation of yellow (Y), magenta (M), cyan (C), and black (Bk) toner images. In the following description, in a case where there is no need to distinguish colors, reference numerals without the alphabets a, b, c, and d at the ends may also be used.

(Image Forming Unit)

First, an image forming unit (hereinafter also referred to as an image forming station) for forming yellow (Y) toner images will be described. A photoconductor drum **1*a* as a photosensitive member is a plurality of functional organic material layers that are stacked in a multilayer manner, the plurality of functional organic material layers including a carrier generation layer where electric charge is generated by the surface of a metal cylinder being hit by light and an electric charge transport layer through which the generated electric charge is transported. The outermost layer of the photoconductor drum 1***a* has poor conductivity and is almost an insulator.

A charging roller 2*a* as a charging unit abuts against the photoconductor drum 1*a* and uniformly charges the surface of the photoconductor drum 1*a* while rotating so as to follow rotation of the photoconductor drum 1*a*. A direct-current voltage or a voltage obtained by superposing an alternating-current voltage on the direct-current voltage is applied to the charging roller 2*a*, and electric discharge occurs in small air gaps upstream and downstream of a contact nip between the charging roller 2*a* and the surface of the photoconductor drum 1*a*, so that the photoconductor drum 1*a* is charged.

A scanner unit 11*a* as a light irradiation unit is configured to scan laser light using a polygon mirror or to perform light irradiation using a light-emitting diode (LED) array. The scanner unit 11*a* forms an electrostatic latent image by irradiating the surface of the photoconductor drum 1*a* (the surface of the photosensitive member) with a beam 12*a* modulated on the basis of an image signal. A development unit 8*a* as a developing device is constituted by a development roller 4*a*, a nonmagnetic one-component developer 5*a*, and a developer blade 7*a*. The development roller 4*a* abuts against the photoconductor drum 1*a*. An electrostatic latent image formed on the photoconductor drum 1*a* is developed as a toner image (a developer image) by the development roller 4*a*. The development roller 4*a* at the time of development is driven and rotated by a drive unit such as a development motor, which is not illustrated. A developed toner image is primarily transferred onto an intermediate transfer belt 80 serving as an image carrier (onto the image carrier) by applying a primary transfer bias to a primary transfer roller 81*a*. After the primary transfer, transfer residual toner left on the photoconductor drum 1*a* is cleaned by a cleaning unit 3*a*.

The charging roller 2*a* is connected to a charge bias power supply 20*a* serving as a unit for supplying voltage to the charging roller 2*a*, and power is supplied to the charging roller 2*a*. The development roller 4*a* is connected to a development bias power supply 21*a* serving as a unit for supplying voltage to the development roller 4*a*, and power is supplied to the development roller 4*a*. The primary transfer roller 81*a* is connected to a primary transfer bias power supply 84*a* serving as a unit for supplying voltage to the primary transfer roller 81*a*, and power is supplied to the primary transfer roller 81*a*. Note that the photoconductor drum 1*a*, the charging roller 2*a*, the cleaning unit 3*a*, the development roller 4*a*, the nonmagnetic one-component developer 5*a*, the developer blade 7*a*, and the development unit 8*a*, which are described above, can be formed as a single integrated process cartridge 9*a*, which can be attachable to and detachable from the image forming apparatus 100. That is, the process cartridge 9 contains a developer. However, the configuration of the cartridge is not limited to this. The cartridge can be divided into a drum cartridge that includes, for example, the photoconductor drum 1*a* and a development cartridge that includes, for example, the development unit 8*a*.

The description above is about the configuration of the image forming station corresponding to yellow. The configurations of image forming stations corresponding to magenta, cyan, and black are substantially the same as that corresponding to yellow. The individual units have identical reference numerals to which the alphabets b, c, and d are added at the ends, and detailed description will be omitted here. Note that, in the following, the station for forming yellow (Y) toner images is also referred to as a first station.

Similarly, the station for forming magenta (M) toner images is also referred to as a second station, the station for forming cyan (C) toner images as a third station, and the station for forming black (K) toner images as a fourth station. In the direction in which the intermediate transfer belt 80 moves, the first station is arranged furthermost upstream, and then the second station, the third station, and the fourth station are arranged in this order from the furthermost upstream side.

The intermediate transfer belt 80 is supported by three rollers, which are a secondary transfer opposing roller 86, a driving roller 14, and a tension roller 15 serving as stretching members, and is configured to maintain proper tension. By driving the driving roller 14, the intermediate transfer belt 80 is rotated and moved in a forward direction with respect to the photoconductor drums 1*a* to 1*d* at almost constant speed. On the inner side of the intermediate transfer belt 80, the primary transfer rollers 81*a* to 81*d*, which abut on the intermediate transfer belt 80, are arranged so as to face the photoconductor drums 1*a* to 1*d*. The primary transfer rollers 81*a* to 81*d* are connected to the primary transfer bias power supplies 84*a* to 84*d*, respectively. Individual color toner images formed on the photoconductor drums 1*a* to 1*d* are sequentially transferred onto the intermediate transfer belt 80 by the primary transfer rollers 81*a* to 81*d*, so that a color image is formed. Moreover, static elimination members 23*a* to 23*d* are arranged downstream of the primary transfer rollers 81*a* to 81*d* in the direction in which the intermediate transfer belt 80 is rotated. The driving roller 14, the tension roller 15, the static elimination members 23*a* to 23*d*, and the secondary transfer opposing roller 86 are electrically grounded by wiring lines that are not illustrated.

In order to feed, for example, a recording material P, which is a piece of paper, from a paper feed cassette 16, a pickup roller 17 is driven by a stepping motor that is not illustrated (hereinafter also referred to as a paper feed motor).

As a result, a bottom plate 29 is lifted, and recording materials P stacked in the paper feed cassette 16 are pushed up.

The topmost one of the pushed up recording materials P comes into contact with the pickup roller 17 and is fed by the pickup roller 17 rotating. The fed recording material P is sent to a registration roller 18. When a registration sensor 35 detects the leading edge of the recording material P, driving of the paper feed motor is stopped, and sending of the recording material P is temporarily stopped. The recording material P that is temporarily stopped at the registration roller 18 is resent at a predetermined timing to a secondary transfer unit in accordance with movement of toner images transferred onto the intermediate transfer belt 80.

The toner images formed on the photoconductor drums 1*a* to 1*d* in an individual manner are each transferred, and the color image formed on the intermediate transfer belt 80 is moved to a secondary transfer unit corresponding to a secondary transfer position. The secondary transfer unit includes a secondary transfer roller 82 and the intermediate transfer belt 80. By applying a secondary transfer bias to the secondary transfer roller 82, the color image on the intermediate transfer belt 80 is secondarily transferred onto the recording material P. Note that a secondary transfer bias power supply 85 is connected to the secondary transfer roller 82, and this secondary transfer bias power supply 85 applies a secondary transfer bias to the secondary transfer roller 82.

The recording material P on which the color image is secondarily transferred is sent to a fixing unit 19 (a first member). The fixing unit 19 includes a fixing film 31 (a heating member) and a pressure roller 32 (a pressure member), which applies pressure to the recording material P. The fixing unit 19 adds heat and applies pressure to the color image that is secondarily transferred onto the recording material P, so that the toner images are fixed on the recording material P. Note that the fixing unit 19 is provided with a fixing heater 33 and a fixing thermistor 34, and the fixing thermistor 34 is configured to detect the temperature of the fixing heater 33. The temperature of the fixing heater 33 is adjusted in accordance with a detection result from the fixing thermistor 34. The recording material P having toner images fixed by the fixing unit 19 is detected by a paper discharge sensor 30 (a discharge sensor) and is thereafter output to a paper discharge tray 36, and this series of image forming operations is complete. Note that the above-described image forming operations are executed by an engine controller 200 controlling the individual members.

[Apparatus Temperature Detection Unit]

In the present exemplary embodiment, sensors configured to detect temperature and installed in the image forming apparatus 100 include the fixing thermistor 34 provided in the fixing unit 19 and an environmental temperature sensor 37 provided near the paper feed cassette 16. As described above, the fixing thermistor 34 is provided to acquire the temperature of the fixing heater 33, and by extension that of the fixing unit 19. The environmental temperature sensor 37 is provided to acquire an external temperature outside the image forming apparatus 100.

When the image forming operations are executed, for example, the fixing heater 33 generates heat, electric elements provided on an electric board generate heat, and the recording material P heated by the fixing unit 19 is sent. For these reasons, the internal temperature of the image forming apparatus 100 increases. As a mechanism to suppress an increase in the internal temperature of the image forming apparatus 100, the image forming apparatus 100 has one cooling fan, which is not illustrated.

As the internal temperature increases, the temperature of all the members included in the image forming apparatus 100 generally increases. Among all the members, examples of a member that is greatly affected by an increase in temperature are the process cartridges 9 and the paper discharge sensor 30, which is provided near the fixing unit 19.

[Control Block Diagram]

Figure 2A:
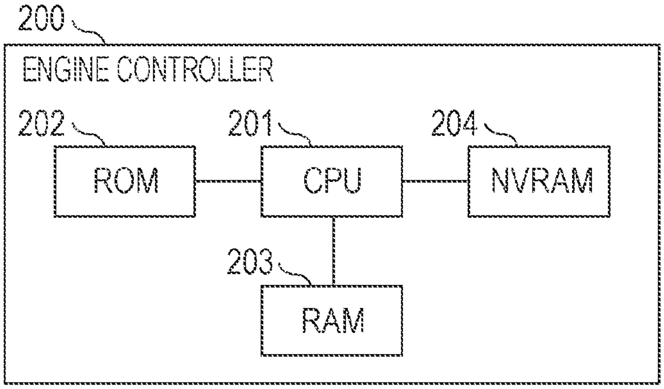
FIGS. 2A-2B are a diagram of a system configuration of the image forming apparatus.

FIG. 2A is a block diagram illustrating the configuration of the engine controller 200. The image forming apparatus 100 is provided with the engine controller 200 serving as a control unit that performs central control on operations of the individual units of the image forming apparatus 100. The engine controller 200 includes a central processing unit (CPU) 201 serving as a computing unit and a read-only memory (ROM) 202, a random access memory (RAM) 203, and a nonvolatile RAM (NVRAM) 204 serving as memories. The CPU 201 performs various types of arithmetic processing that is necessary to control the image forming apparatus 100. The ROM 202 is a memory for storing fixed information and is a memory in which information is stored such as programs, parameters, and tables that are necessary for the CPU 201 to perform computing. The RAM 203 is a rewritable memory in which information is temporarily stored that is necessary when the CPU 201 performs arithmetic processing. The NVRAM 204 is a nonvolatile memory that is not initialized even in a case where power supply to the image forming apparatus 100 is stopped.

In the present exemplary embodiment, temperature control of the process cartridges 9 will be described. Regarding the process cartridges 9, an increase in temperature is large especially in a case where high-volume continuous printing is performed in a duplex print mode. In this case, when the temperatures of the development units 8 increase excessively, the developers 5 contained inside the development units 8 exceed the glass transition temperature and melt, and the melted developers may adhere to, for example, sealing members inside the process cartridges 9. As a result, this may result in a poor image or cause a toner leak. Thus, the image forming apparatus 100 according to the present exemplary embodiment estimates the temperatures of the process cartridges 9 (second members), especially the temperatures of the development units 8, and controls the operations of the process cartridges 9 such that the estimated temperatures do not exceed a preset temperature.

Figure 2B:
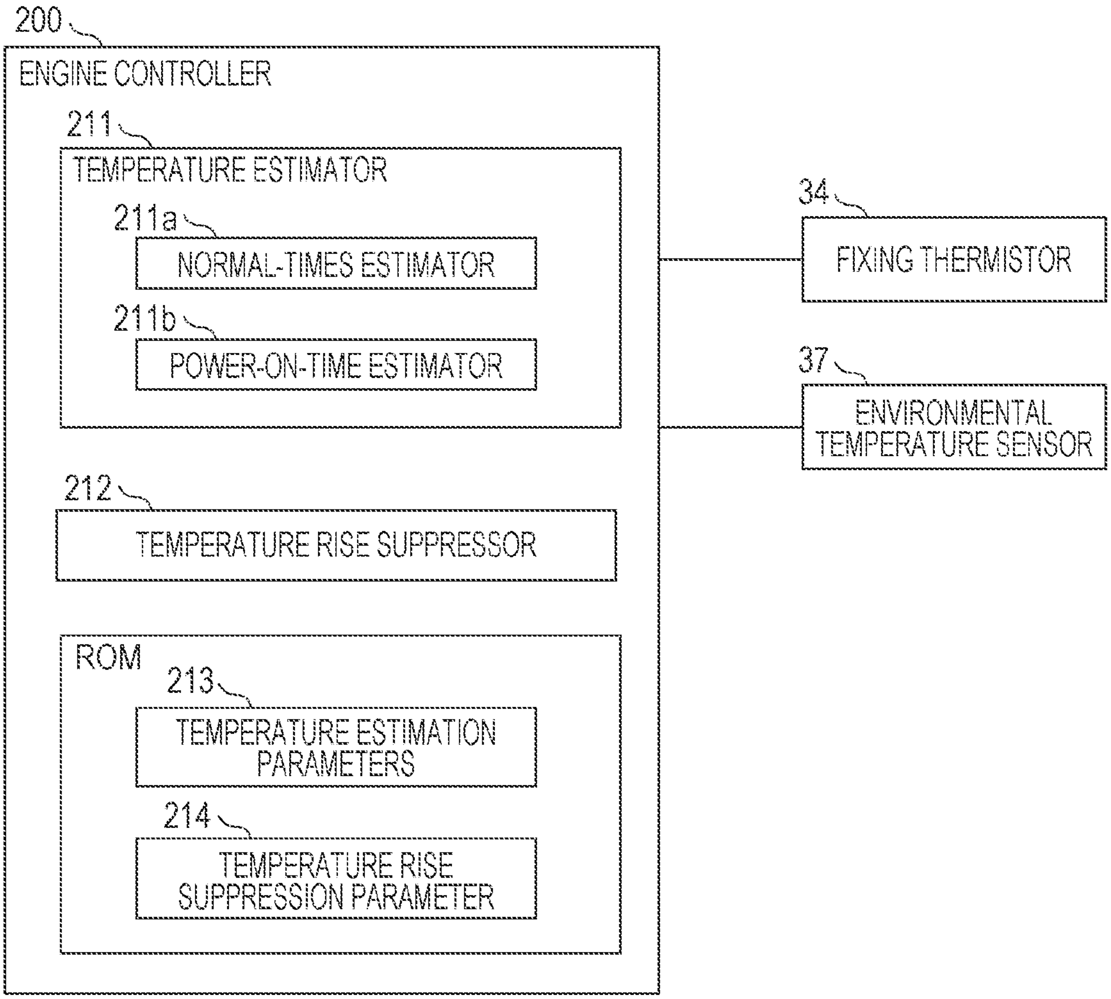

FIG. 2B is a block diagram illustrating functions realized in the engine controller 200 by the CPU 201 executing a program stored in the ROM 202. The engine controller 200 has a temperature estimator 211 and a temperature rise suppressor 212. The temperature estimator 211 serves as an estimator that estimates the temperatures of the process cartridges 9 (especially the development units 8) serving as estimation targets. The temperature rise suppressor 212 serves as a temperature rise suppression unit. In order to estimate the temperatures of the process cartridges 9, the temperature estimator 211 uses information from the fixing thermistor 34 and the environmental temperature sensor 37. The temperature rise suppressor 212 controls the operation of the image forming apparatus 100 such that cartridge temperatures T do not exceed a threshold temperature Tmax, which is a certain preset threshold. The threshold temperature Tmax is prestored as a temperature rise suppression parameter 214 in the ROM 202.

The temperature estimator 211 has a normal-times estimator 211*a* and a power-on-time estimator 211*b*. The normal-times estimator (hereinafter also referred to as a "first estimator") 211*a* estimates each cartridge temperature T at time intervals $\Delta t$ in normal times of the image forming apparatus 100. Normal times refer to a state where power is supplied to the image forming apparatus 100, the power switch is turned on, and the image forming apparatus 100 can normally operate. That is, normal times refer to a state where the image forming apparatus 100 is performing a print operation or an adjustment operation or a state where the image forming apparatus 100 is on standby for the print operation or the adjustment operation. The power-on-time estimator (hereinafter also referred to as a "second estimator") 211*b* estimates the cartridge temperature T when the image forming apparatus 100 is powered on, for example, when power is restored from a power failure or when the inlet cable is plugged into an outlet.

The temperature estimator 211 uses temperature estimation parameters 213 as fixed parameters in a case where the cartridge temperature T is to be calculated. The temperature estimation parameters 213 have been experimentally acquired in advance by adhering a thermocouple (not illustrated) to each development unit 8 and monitoring changes in actual measured temperature Tt, which is an actual measured temperature value, while various operations of the image forming apparatus 100 are being performed or stopped. The acquired temperature estimation parameters 213 are stored in the ROM 202 in advance.

Note that, in the present exemplary embodiment, the temperatures of the process cartridges 9 are estimation targets; however, the present disclosure is not limited thereto, and the temperatures of other members inside the image forming apparatus 100 may be estimation targets. In particular, in terms of space and cost, control performed in the present exemplary embodiment is effective in a case where the temperature of a portion where a sensor that directly detects the temperature of the portion is not provided is to be estimated.

[Details of Internal Temperature Control]

In the present exemplary embodiment, temperature estimation is performed by the image forming apparatus 100 under control that is roughly divided into control performed by the above-described first estimator 211*a* and control performed by the above-described second estimator 211*b*. By estimating internal temperatures under these types of control, changes in internal temperature (=the cartridge temperatures T) can be monitored in every situation such as while the apparatus is operating and while the apparatus is stopped. In the following, the ways in which internal temperatures are estimated in the first estimator 211*a* and in the second estimator 211*b* will be described in order.

(Temperature Estimation in First Estimator)

When each cartridge temperature T is calculated, the first estimator 211*a* uses a destination temperature rise amount Cx and a temperature variation coefficient (a temperature change coefficient) k as the temperature estimation parameters 213. The cartridge temperature T can be expressed by the following equation using an environmental temperature Te of image forming apparatus.

$$T=Te+Cc \tag{1}$$

Cc represents a temperature rise amount of the process cartridge 9 with respect to the environmental temperature. In the present exemplary embodiment, the cartridge temperature rise amount Cc is modeled using the following equation.

$$Cc=Cx-(Cx-C0)\cdot\exp(-kt) \tag{2}$$

In this case, in Equation (2), t denotes an elapsed time, and C0 denotes an initial temperature rise amount of the process cartridge 9 (a temperature rise amount at t=0).

Figure 3:
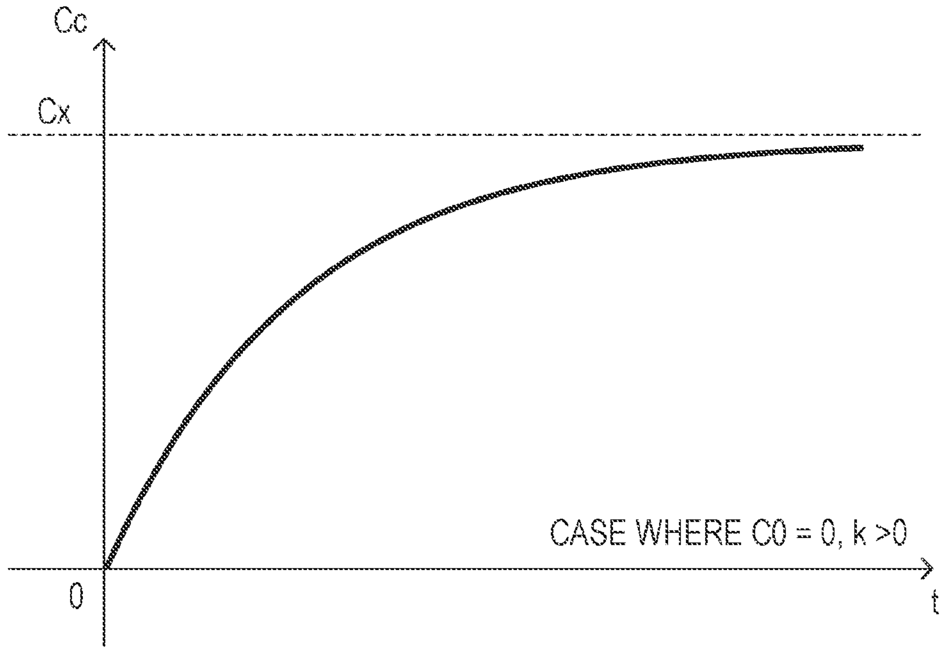
FIG. 3 is a schematic diagram illustrating temperature rise characteristics of an internal temperature.

FIG. 3 is a schematic diagram illustrating temperature rise characteristics of each process cartridge 9 expressed by Equation (2) described above. FIG. 3 illustrates the way in which the cartridge temperature T rises as the image forming apparatus 100 is operated. In FIG. 3, in an initial state in which C0=0, that is, t=0, a case is illustrated where there is not a difference between the temperature of the process cartridge 9 and the environmental temperature Te. When the process cartridge 9 whose temperature has risen from the temperature in the state where C0=0 reaches thermal equilibrium after a certain time has elapsed, the temperature of the process cartridge 9 converges to a temperature corresponding to the destination temperature rise amount Cx. A temperature variation coefficient k represents the level of the rate (the inclination) of temperature rise change. The greater the value of the temperature variation coefficient k, the steeper the temperature rise. FIG. 3 illustrates characteristics of a case where C0<Cx; however, in a case where C0>Cx, the temperature rise amount has a characteristic in which the temperature rise amount decreases from C0 and converges to Cx. In this case, cartridge temperature fall characteristics can be modeled.

The temperature variations of the process cartridges 9 vary depending on the operation mode of the image forming apparatus 100. Thus, destination temperature rise amounts Cx and temperature variation coefficients k unique to respective various operation modes of the image forming apparatus 100 in normal operations are set, and these parameters are stored in the ROM 202. Examples of the various operation modes include a duplex printing mode, a simplex printing mode, and a standby mode.

Cx and k are obtained by operating and stopping the image forming apparatus 100 in each operation mode and performing fitting on the actual measured temperatures of the process cartridges 9 by using an approximate curve of Equation (2). Each parameter is acquired when the temperature rises and also when the temperature falls. Cx and k have been acquired for all the states and are stored in the ROM 202 in advance. A temperature variation coefficient k at the time when the temperature rises and a temperature variation coefficient k at the time when the temperature falls usually have different values. Thus, for each mode, a temperature variation coefficient k at the time when the temperature rises is acquired as an at-rising-time temperature change coefficient kup, and a temperature variation coefficient k at the time when the temperature falls is acquired as an at-falling-time temperature change coefficient kdown.

Figure 4:
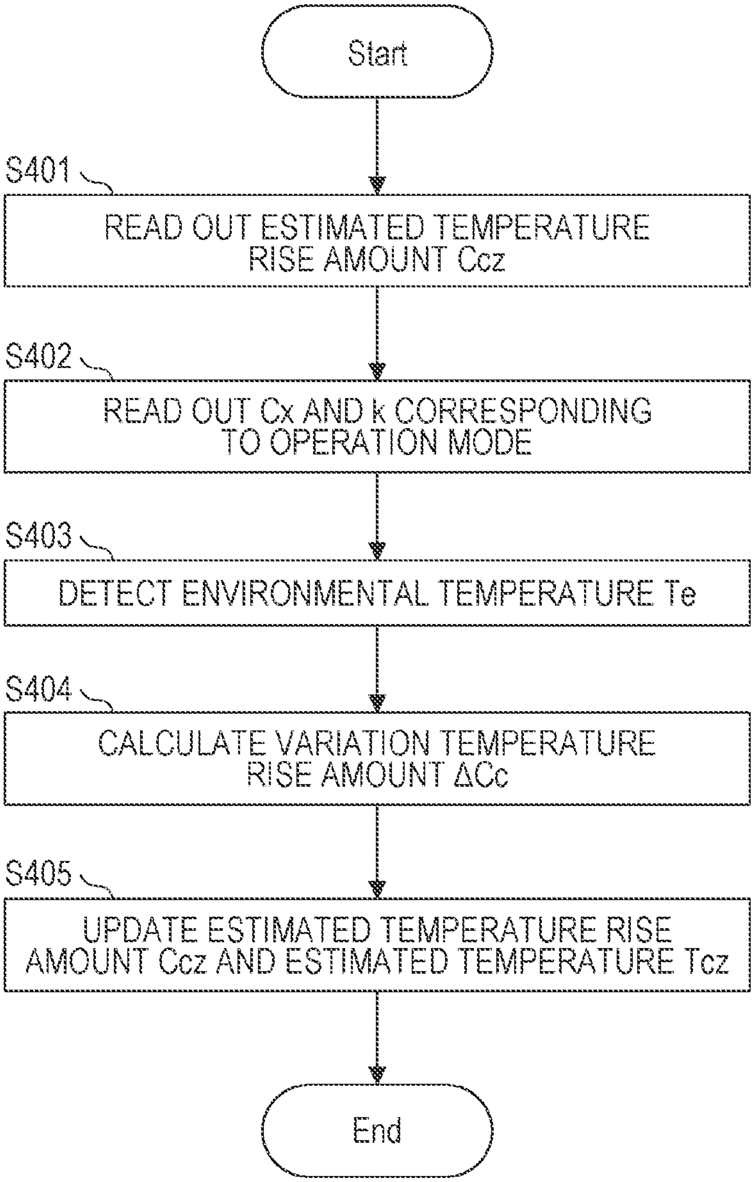
FIG. 4 is a flow chart illustrating the procedure of internal temperature estimation for the image forming apparatus.

Next, temperature estimation processing performed by the first estimator 211*a* will be described with reference to the flow chart illustrated in FIG. 4. The flow chart illustrated in FIG. 4 is realized when the CPU 201 included in the engine controller 200 executes a program stored in the ROM 202. Actual temperature estimation processing is performed by updating an estimated cartridge temperature rise amount Ccz of each process cartridge 9 based on Equation (2) in succession at predetermined time Δt (described above) intervals. In order to do this, an algorithm is used in which temperature rise amount changes in Equation (2) are changed into a difference equation, and the estimated cartridge temperature rise amount Ccz is updated at Δt intervals.

First, in S401, the first estimator 211*a* reads out, from the RAM 203, the estimated cartridge temperature rise amount Ccz estimated so far. In S402, the first estimator 211*a* reads out, from the ROM 202, the destination temperature rise amount Cx and the temperature variation coefficient k corresponding to the operation mode of the image forming apparatus 100. In S403, the first estimator 211*a* acquires a detection result of the environmental temperature Te from the environmental temperature sensor 37. In S404, the first estimator 211*a* calculates, using Equation (3) below, a variation temperature rise amount ΔCc of the estimated cartridge temperature rise amount Ccz for the time interval Δt.

$$\Delta Cc=k\times\Delta t\times(Cx-Ccz) \tag{3}$$

In S405, the first estimator 211*a* calculates the estimated cartridge temperature rise amount Ccz using Equation (4) below and causes the RAM 203 to update and store the estimated cartridge temperature rise amount Ccz. Moreover, the first estimator 211*a* calculates, using Equation (5) below, an estimated cartridge temperature Tcz and causes the RAM 203 to update and store the estimated cartridge temperature Tcz.

$$Ccz=Ccz+\Delta Cc \tag{4}$$

$$Tcz=Te+Ccz \tag{5}$$

The first estimator 211*a* performs the above-described processing corresponding to the flow chart illustrated in FIG. 4 at the time intervals Δt, and constantly performs cartridge temperature estimation while the engine is operating. In the present exemplary embodiment, these time intervals Δt are set to six seconds.

(Temperature Estimation in Second Estimator)

As described above, the second estimator 211*b* estimates the first cartridge temperature T in a case where power supply is restored from the state in which power supply to the image forming apparatus 100 is stopped. First, basic temperature estimation control in the second estimator 211*b* will be described.

Figure 5:
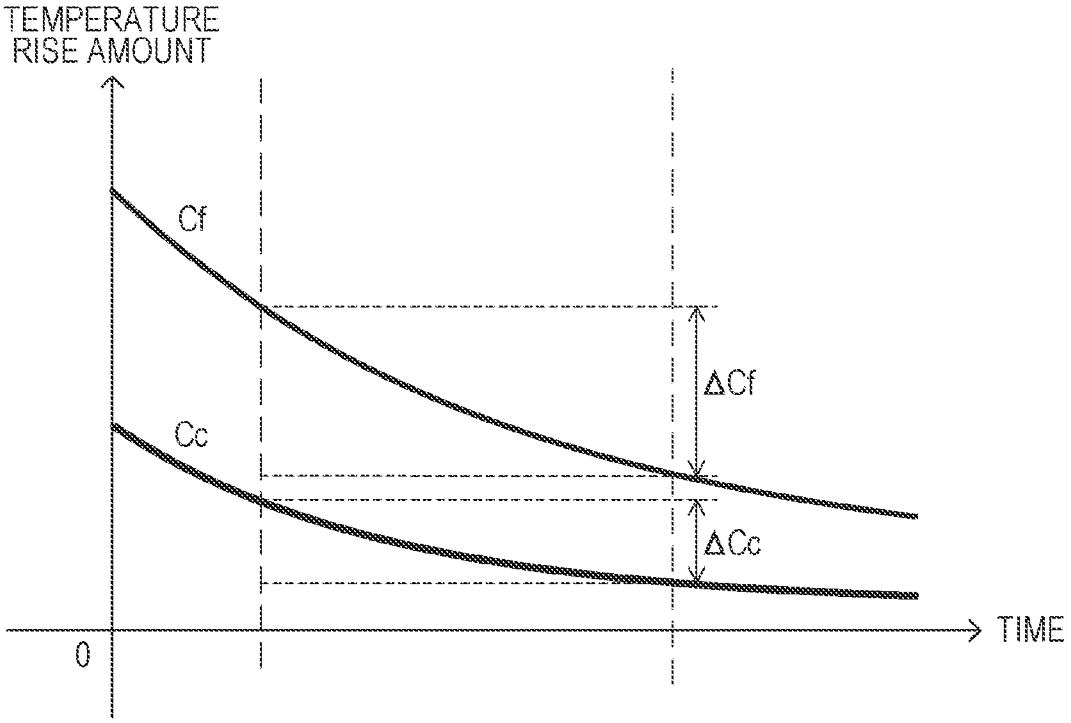
FIG. 5 is a schematic diagram illustrating temperature fall characteristics of a fixing unit and a cartridge of the image forming apparatus.

FIG. 5 is a schematic diagram illustrating temperature fall characteristics of a fixing-unit temperature rise amount Cf and the cartridge temperature rise amount Cc while power supply is stopped. Since the image forming apparatus 100 is not operating while power supply is stopped, both values of Cf and Cc basically decrease with time. In a case where a time period during which power supply is stopped is long, normally, both values eventually converge to a temperature rise amount of 0 (the corresponding temperature is the environmental temperature Te). By using this characteristic and on the basis of an evaluation result of changes in temperature rise amount (negative values in a case where the temperature is falling) in the fixing unit 19 from stoppage to restart of power supply, the temperature rise amount of each process cartridge 9 at that time can be estimated. That is, once a fixing-unit temperature rise amount change ΔCf while power supply is stopped is known, a cartridge temperature rise amount change ΔCc can be uniquely determined. The characteristics in FIG. 5 vary depending on, for example, the device configuration of the image forming apparatus 100. Thus, the cartridge temperature rise amount can be estimated using the apparatus's characteristics that have been experimentally acquired in advance.

Note that, in FIG. 5, ΔCf and ΔCc at the time of stoppage of power supply are described as an example; however, power supply may be stopped when final printing before stoppage of power supply is complete, and the cartridge temperature rise amount may be estimated from ΔCf and ΔCc obtained after power supply is restarted. This method is used in the present exemplary embodiment.

The above-described description is about a way of thinking about basic temperature estimation control in the second estimator; however, the inventor found a method for further improving the estimation accuracy as a result of a diligent examination. The method will be described below.

Figure 6:
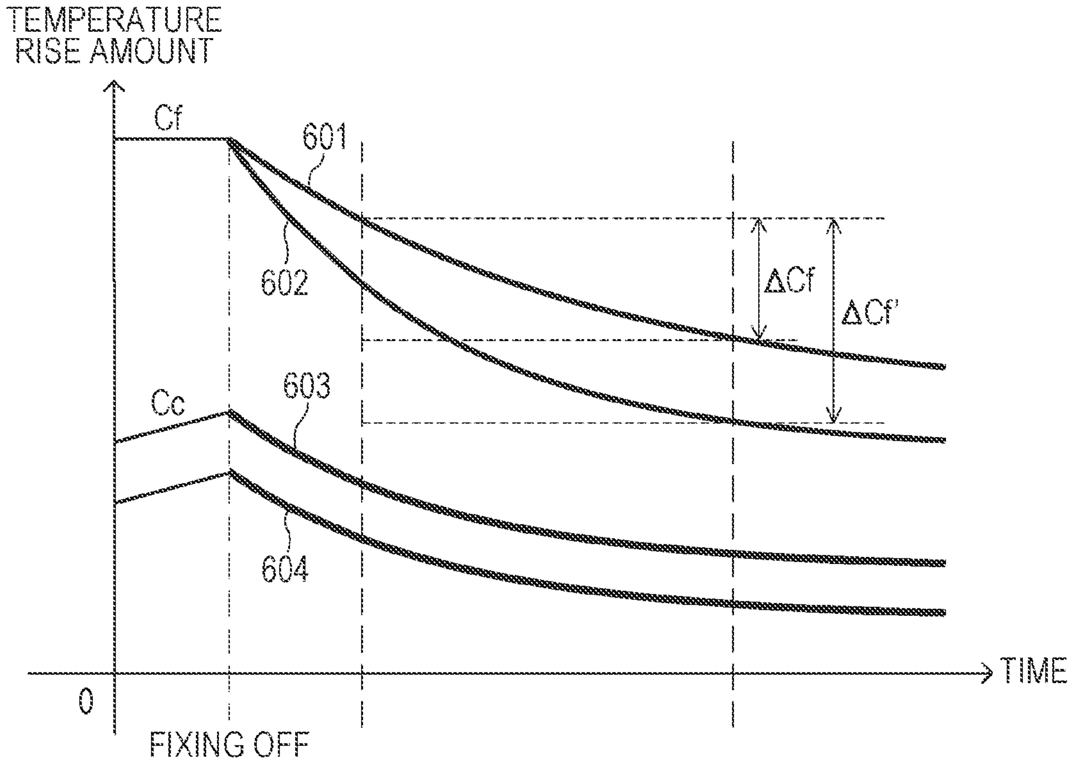
FIG. 6 is a schematic diagram illustrating the effects of an operation history of the image forming apparatus on temperature fall characteristics of the fixing unit.

FIG. 6 is a schematic diagram illustrating two patterns of temperature fall characteristics of the fixing-unit temperature rise amount Cf. It was experimentally confirmed that the temperature fall characteristics of the fixing-unit temperature rise amount Cf change in accordance with an operation history of the image forming apparatus 100 until stoppage of power supply. That is, in a case where the internal temperature in the image forming apparatus 100 has sufficiently risen after, for example, performance of high volume printing, the fixing-unit temperature rise amount change ΔCf with respect to the passage of time is small. The temperature fall characteristics corresponding to this case is illustrated as a graph 601. In contrast, in a case where the internal temperature has insufficiently risen after, for example, performance of low volume printing, a fixing-unit temperature rise amount change ΔCf with respect to the passage of time is large. The temperature fall characteristics corresponding to this case is illustrated as a graph 602.

By considering the above-described temperature fall characteristics, the accuracy with which the cartridge temperature rise amount is estimated can be improved in the present exemplary embodiment. That is, characteristics of the fixing-unit temperature rise amount Cf and the cartridge temperature rise amount Cc after performance of low to high volume printing have been measured in advance, and a temperature fall characteristic to be used for calculation is selected in accordance with a characteristic value indicating the operation history of the image forming apparatus 100 such as the number of printed pages (sheets). In FIG. 6, in a case where the fixing-unit temperature rise amount Cf indicates a temperature fall characteristic of the graph 601, the cartridge temperature rise amount Cc indicates a temperature fall characteristic of a graph 603. In contrast, in a case where the fixing-unit temperature rise amount Cf indicates a temperature fall characteristic of the graph 602, the cartridge temperature rise amount Cc indicates a temperature fall characteristic of a graph 604. These pieces of data are obtained by having experimentally measured the individual temperatures in advance.

Characteristic values indicating the operation history of the image forming apparatus 100 may include the number of continuously printed pages (sheets) for a job executed immediately before stoppage of power supply to the image forming apparatus 100. In addition, other than the number of printed pages (sheets), any one of values that change in accordance with the operation history of the image forming apparatus 100 can be used. Examples of the values include the cartridge temperatures T estimated by the first estimator 211*a* before stoppage of power supply, and the environmental temperature Te detected by the environmental temperature sensor 37. Moreover, other than the values described above, for example, a temperature detected by a temperature sensor other than the environmental temperature sensor 37 (a sensor for detecting the temperature of a member other than the cartridges) may be used. In the present exemplary embodiment, the cartridge temperatures T (=the cartridge temperature rise amounts Cc) are used, and a characteristic is used in which the higher the printing volume is, the higher the cartridge temperatures T become.

Table 1 is a table representing the relationship between changes in each cartridge temperature rise amount Cc and changes in the fixing-unit temperature rise amount Cf, the changes being measured after restart of power supply in the present exemplary embodiment. That is, Table 1 has table information indicating a correspondence relationship between data representing temperature change characteristics of the fixing unit 19 and data representing temperature change characteristics of the process cartridges 9. The rate of change in the temperature of the fixing unit 19 after restart of power supply (a second timing) with respect to the temperature of the fixing unit 19 before stoppage of power supply (a first timing) (hereinafter referred to as the rate of change in fixing-unit temperature rise amount) is described in the first column. The rate of change in the temperature of each process cartridge 9 after restart of power supply with respect to the temperature of the process cartridge 9 before stoppage of power supply (hereinafter referred to as the rate of change in cartridge temperature rise amount) is described in the second and subsequent columns.

As described above, characteristics of the rate of change in cartridge temperature rise amount change on the basis of each value of the cartridge temperature rise amount Cc before stoppage of power supply (the first row). In the present exemplary embodiment, the operation history of the image forming apparatus 100 is classified into five patterns in accordance with the values of the cartridge temperature rise amount Cc. The values of the cartridge temperature rise amount Cc in the first row are acquired after last printing performed before stoppage of power supply and are stored in the NVRAM 204. After restart of power supply, a table to be used is selected on the basis of the values.

TABLE 1

| rate of change in fixing-unit temperature rise amount | [1]Cc > 20 | [2]20 ≤ Cc < 16 | [3]16 ≤ Cc < 12 | [4]12 ≤ Cc < 8 | [5]Cc < 8 |
|---|---|---|---|---|---|
| 1 | 1.00 | 1.00 | 1.00 | 1.00 | 1.00 |
| 0.9 | 1.00 | 1.00 | 0.99 | 0.99 | 0.98 |
| 0.8 | 1.00 | 0.99 | 0.98 | 0.98 | 0.97 |
| 0.7 | 0.97 | 0.97 | 0.97 | 0.96 | 0.94 |
| 0.6 | 0.92 | 0.91 | 0.91 | 0.90 | 0.87 |
| 0.5 | 0.84 | 0.82 | 0.81 | 0.80 | 0.78 |
| 0.4 | 0.73 | 0.70 | 0.68 | 0.66 | 0.64 |
| 0.3 | 0.58 | 0.55 | 0.52 | 0.49 | 0.46 |
| 0.2 | 0.41 | 0.37 | 0.32 | 0.28 | 0.24 |
| 0.1 | 0.21 | 0.15 | 0.09 | 0.04 | 0.00 |
| 0 | 0.00 | 0.00 | 0.00 | 0.00 | 0.00 |

Figure 7:
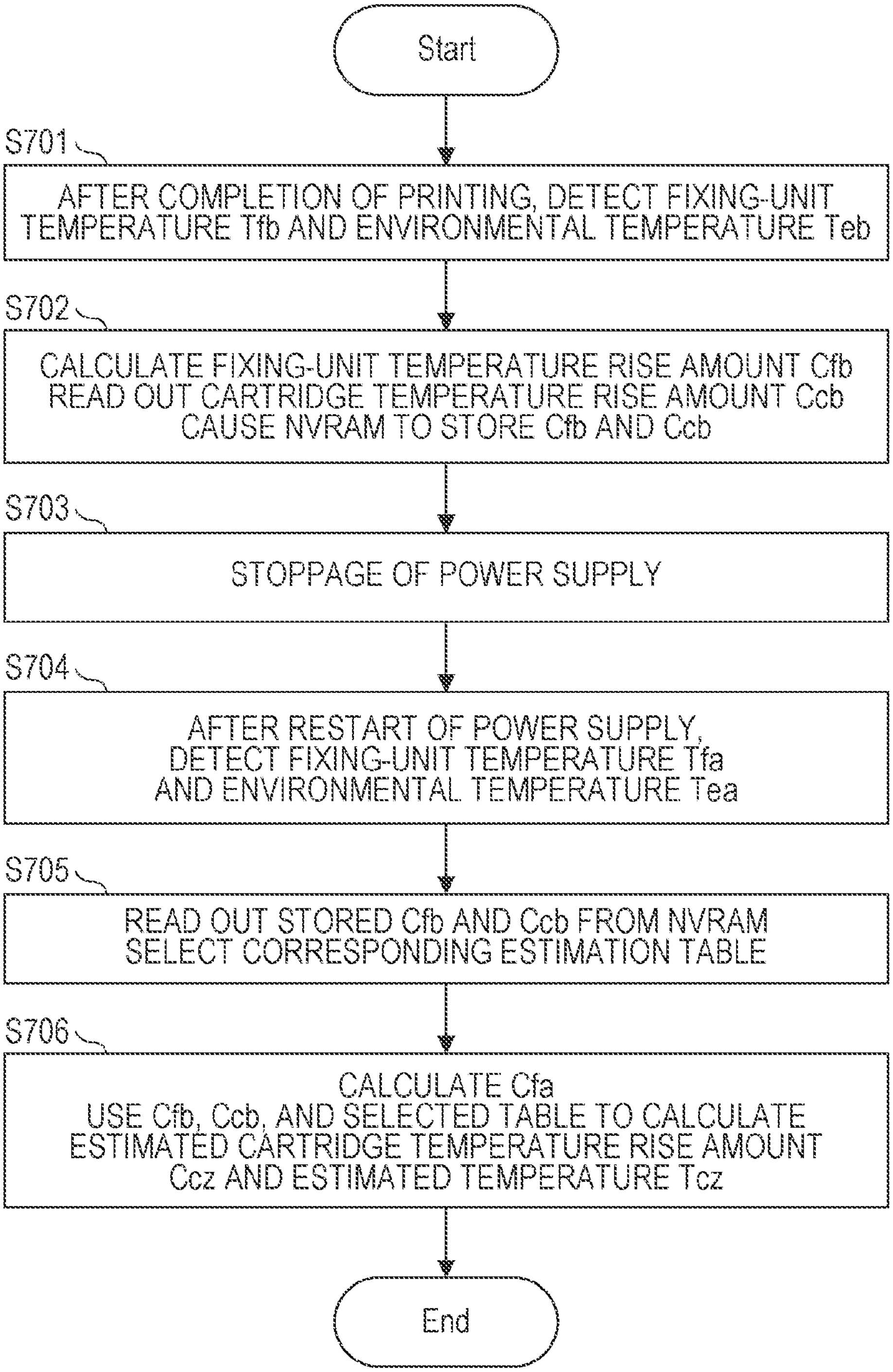
FIG. 7 is a flow chart illustrating control performed according to one or more aspects of the present disclosure.

In the following, control in the second estimator 211*b* in the present exemplary embodiment will be described using the flow chart of FIG. 7. The flow chart illustrated in FIG. 7 is realized when the CPU 201 included in the engine controller 200 executes a program stored in the ROM 202.

In S701, after completion of printing (=after stoppage of energization of the fixing heater 33), the second estimator 211*b* detects a fixing-unit temperature Tfb and an environmental temperature Teb using the fixing thermistor 34 and the environmental temperature sensor 37 in a respective manner. In S702, the second estimator 211*b* uses Tfb and Teb detected in S701 to calculate a fixing-unit temperature rise amount Cfb at this timing using the following Equation (6).

$$Cfb=Tfb-Teb \quad (6)$$

The second estimator 211*b* reads out a cartridge temperature rise amount Ccb from the RAM 203 and causes the NVRAM 204 to store the values of Cfb and Ccb. In S703, suppose that power supply to the image forming apparatus 100 is stopped by the user performing, for example, an operation for removing the inlet cable from the outlet or due to an event such as a power failure. In S704, after power supply to the image forming apparatus 100 is restarted by the user performing, for example, an operation for inserting the inlet cable into the outlet or due to an event such as power restoration, the second estimator 211*b* detects a fixing-unit temperature Tfa and an environmental temperature Tea in the same way as in S701.

In S705, the second estimator 211*b* reads out the cartridge temperature rise amount Ccb stored in the NVRAM 204 and selects a cartridge temperature rise amount estimation table from Table 1 on the basis of the value of Ccb. The rate of change in fixing-unit temperature rise amount in Table 1 is expressed as a ratio Rf of Cf (=Cfa) at the time of restart of power supply to Cf (=Cfb) at the time of completion of printing, and can be obtained by the following equation.

$$Rf=Cfa/Cfb \quad (7)$$

The rate of change in cartridge temperature rise amount is expressed as a ratio Rc of Cc (=Cca) at the time of restart of power supply to Cc (=Ccb) at the time of completion of printing, and can be obtained by the following equation.

$$Rc=Cca/Ccb \quad (8)$$

The second estimator 211*b* is configured to select a table representing an appropriate relationship between Rf and Rc on the basis of Table 1 and the value of Ccb read out in S705. In S706, the second estimator 211*b* uses the fixing-unit temperature Tfa and the environmental temperature Tea detected in S704 to calculate the fixing-unit temperature rise amount Cfa using Equation (6). Furthermore, by applying the relationships regarding Equations (7) and (8) to Cfb and Ccb read out in S705 and the selected table, the second estimator 211*b* can calculate the cartridge temperature rise amount Cca corresponding to the time of restart of power supply.

That is, this value corresponds to the estimated cartridge temperature rise amount Ccz. Lastly, the second estimator 211*b* uses the calculated Ccz to calculate the estimated cartridge temperature Tcz using the relationship regarding Equation (1).

In the present exemplary embodiment, the relationship between the rate of change in fixing-unit temperature rise amount and the rate of change in cartridge temperature rise amount is used as a fixing-unit temperature rise amount change of Table 1; however, the values of the respective rates of change in fixing-unit temperature rise amount and in cartridge temperature rise amount can be used as they are.

Moreover, in the present exemplary embodiment, the relationships in Table 1 can be expressed using approximate expressions.

As one example, the relationship expressed by the case of [1] Cc>20 of Table 1 is approximated using a quadratic polynomial and can be expressed as in Equation (9).

$$Rc=-1.36(Rf)^2+2.36(Rf) \quad (9)$$

Equation (9) is an equation that derives data representing a temperature change characteristic of the process cartridge 9 (the ratio Rc) by using, as an argument, data representing a temperature change characteristic of the fixing unit 19 (the ratio Rf).

Once the ratio Rc can be obtained, the cartridge temperature rise amount Cca at the time of restart of power supply can be obtained using Equation (8).

Similarly, even for the cases of [2] to [5] in Table 1, the ratios Rc can also be expressed using appropriate approximate expressions. With this method, numerical value data illustrated in Table 1 does not have to be stored in the ROM 202, and it is sufficient that a plurality of pieces of data such as coefficients used in the approximate expressions be stored in accordance with the operation history of the image forming apparatus 100. Thus, the storage capacity of the ROM 202 can be saved. The second estimator 211*b*, in accordance with a characteristic value representing the operation history of the image forming apparatus 100, selects coefficients to be used and calculates the cartridge temperature rise amount Cca corresponding to the time of restart of power supply using an appropriate approximate expression.

Moreover, in the present exemplary embodiment, a process for storing the characteristic value representing the operation history of the image forming apparatus 100 (=the cartridge temperature rise amount Cc) is performed immediately after completion of printing; however, the process may be performed anytime in a period from completion of printing to stoppage of power supply. In this case, certain control is conceivable under which, for example, the characteristic value is stored in the NVRAM 204 at constant intervals, and when power supply is stopped, the latest characteristic value at the moment is used. Moreover, certain control is also conceivable under which, upon stoppage of power supply, the characteristic value is stored in the NVRAM 204 simultaneously with stoppage of power supply.

Moreover, in the present exemplary embodiment, the cartridge temperature rise amount Ccb before stoppage of power supply is also used as a characteristic value representing the operation history of the image forming apparatus 100; however, it is also possible to use the cartridge temperature rise amount Ccb, which is acquired at another timing. That is, a cartridge temperature rise amount Cc1 acquired at a timing immediately after completion of printing is used as a parameter only for selecting a table in Table 1. Thereafter, a cartridge temperature rise amount Cc2 is acquired at a timing closer to the timing of stoppage of power supply, and it is possible to use, as the cartridge temperature rise amount Ccb before stoppage of power supply, the value of the cartridge temperature rise amount Cc2.

Moreover, in the present exemplary embodiment, the fixing-unit temperature rise amount Cf is acquired on the basis of a detection result from the fixing thermistor 34 at two timings, which are a timing before stoppage of power supply (Cfb) and a timing after the stoppage (Cfa); however, the fixing-unit temperature rise amount Cf may also be acquired only after the stoppage. That is, as the fixing-unit temperature rise amount Cfb before stoppage of power supply, a preset constant value is used, and only Cfa is obtained on the basis of a detection result from the fixing thermistor 34 to calculate the estimated cartridge temperature rise amount Ccz.

Moreover, in the present exemplary embodiment, the cartridge temperature Tcz after restart of power supply is calculated immediately after restart of power supply; however, the cartridge temperature Tcz after restoration of power supply may be calculated anytime before power is supplied again to the fixing heater 33.

Moreover, the cartridge temperature T (the cartridge temperature rise amount Cc) is estimated in the present exemplary embodiment; however, what is estimated is not limited thereto. Temperatures of members or devices within the image forming apparatus 100 such as the above-described paper discharge sensor 30 can be estimated. In that sense, estimation control performed in the present exemplary embodiment can also be referred to as internal temperature estimation.

(Control in Temperature Rise Suppressor)

As described above, the temperature rise suppressor 212 illustrated in FIG. 2B performs control such that each cartridge temperature T does not exceed the threshold Tmax. When $T \geq Tmax$, the temperature rise suppressor 212 shifts the operation mode to a temperature rise suppression mode such that the temperature of the process cartridge 9 does not rise any higher. In the temperature rise suppression mode, the image forming apparatus 100 does not perform printing any more even when the user tries to perform printing. In a case where the operation mode is shifted to the temperature rise suppression mode while performing continuous printing, printing of subsequent pages (sheets) is stopped, and continuous printing is suspended. Thereafter, when the cartridge temperature T decreases and $T < Tmax$ is satisfied in a state where printing is not performed, the temperature rise suppressor 212 returns the operation mode from the temperature rise suppression mode to a normal operation mode, and printing can be performed again. In a case where continuous printing is suspended, printing is restarted.

Note that the operation performed in the temperature rise suppression mode is not limited to stoppage of the above-described print operation, and it is sufficient that processing for suppressing a rise in internal temperature be performed. For example, the print speed may be reduced, or the productivity (throughput) of the image forming apparatus 100 may be reduced by increasing intervals at which the recording materials P are sent. In a case where the image forming apparatus 100 has a cooling fan for cooling the inside thereof, the fan may be started rotating, or the rotation speed of the fan may be increased.

As described above, according to the present exemplary embodiment, the accuracy can be increased with which the temperatures of target portions at the time of restoration of power are estimated.

Second Exemplary Embodiment

Temperature estimation control in a second exemplary embodiment will be described. The basic configuration of the apparatus is substantially the same as that in the first exemplary embodiment, and thus description will be omitted. In the following, control performed differently from that in the first exemplary embodiment will be described.

Control in Second Exemplary Embodiment

In the first exemplary embodiment, as described above, the temperatures of the process cartridges 9 after restoration of power supply are estimated using the relationship between the rate of change in cartridge temperature rise amount and the rate of change in fixing-unit temperature rise amount after restart of power supply. In the present exemplary embodiment, the internal temperature is estimated by applying Equations (3) to (5) used to estimate the cartridge temperature rise amount Cc also to the fixing-unit temperature rise amount Cf.

Note that, in the present exemplary embodiment, not the temperature Tc of each process cartridge 9 but a temperature Ts of the paper discharge sensor 30 is estimated. The paper discharge sensor 30 is often provided near the fixing unit 19 as illustrated in FIG. 1 and is more likely to be affected by heat from the fixing unit 19. A photointerrupter is often used as the paper discharge sensor 30, and heat from the fixing unit 19 may affect an optical element included in the photointerrupter, so that the characteristics of the optical element may change. As a result, this may reduce the accuracy with which the paper discharge sensor 30 performs detection or may result in failure of the paper discharge sensor 30. Thus, it is necessary to estimate the temperature of the paper discharge sensor 30 with high accuracy and to execute the temperature rise suppression mode as appropriate.

(Control in Second Estimator)

Figure 8:
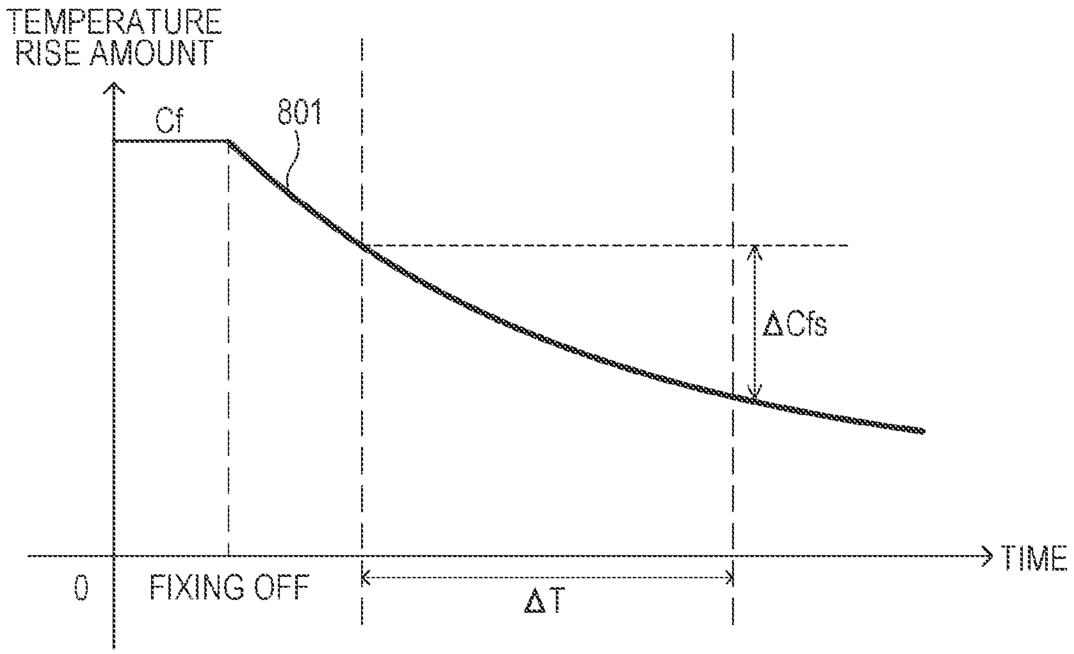
FIG. 8 is a schematic diagram illustrating temperature fall characteristics of the fixing unit of the image forming apparatus.

FIG. 8 is a schematic diagram illustrating temperature fall characteristics of the fixing-unit temperature rise amount Cf in the present exemplary embodiment. The temperature rise amount change of the fixing unit 19 can be expressed also using Equations (3) to (5) as in the case of the process cartridges 9. Thus, once the amount of change in Cf between two certain points is known, an elapsed time between these points (ΔT) can be estimated by performing calculations based on Equations (3) to (5). In this manner, the above-described estimation is performed using the temperature fall characteristics of the fixing unit 19, which have been measured in advance, and values of the temperature variation coefficient k and the destination temperature rise amount Cx, which have been experimentally acquired. The acquired temperature variation coefficient k (Cx is normally 0) is stored in the ROM 202.

Due to substantially the same reason as in the first exemplary embodiment, the temperature fall characteristics of the fixing unit 19 vary depending on the operation history of the image forming apparatus 100 also in this case. Thus, the temperature variation coefficient k varies depending on the operation history. Table 2 illustrates examples of the temperature variation coefficient k indicating the temperature fall characteristics of the fixing-unit temperature rise amount Cf in the present exemplary embodiment. In the present exemplary embodiment, the operation history is classified into four patterns, and a k value, which will be a kdown value, is determined for each pattern of the operation history. Note that, in Table 2, a paper-discharge-sensor temperature rise amount Cs is used as a characteristic value indicating the operation history of the image forming apparatus 100. Even in the present exemplary embodiment, regarding the paper-discharge-sensor temperature rise amount Cs, the first estimator 211*a* always performs temperature estimation in normal operations by using substantially the same method as that for the cartridge temperature rise amount Cc described in the first exemplary embodiment.

TABLE 2

| | [1]Cs > 73 | [2]73 ≥ Cs > 43 | [3]43 ≥ Cs > 19 | [4]Cs ≤ 19 |
|---|---|---|---|---|
| Kf | 4 | 6.2 | 7.9 | 9.3 |

In the present exemplary embodiment, on the basis of the value of the paper-discharge-sensor temperature rise amount Cs at the time of completion of printing, an appropriate k (=kf) is selected. An elapsed time ΔT from stoppage of power supply to restart of power supply is estimated by performing a fixing-unit temperature estimation calculation using the selected kf at the time of restart of power supply. The paper-discharge-sensor temperature rise amount Cs is estimated on the basis of the estimated elapsed time ΔT and using a normal temperature estimation method based on Equations (3) to (5).

Figure 9:
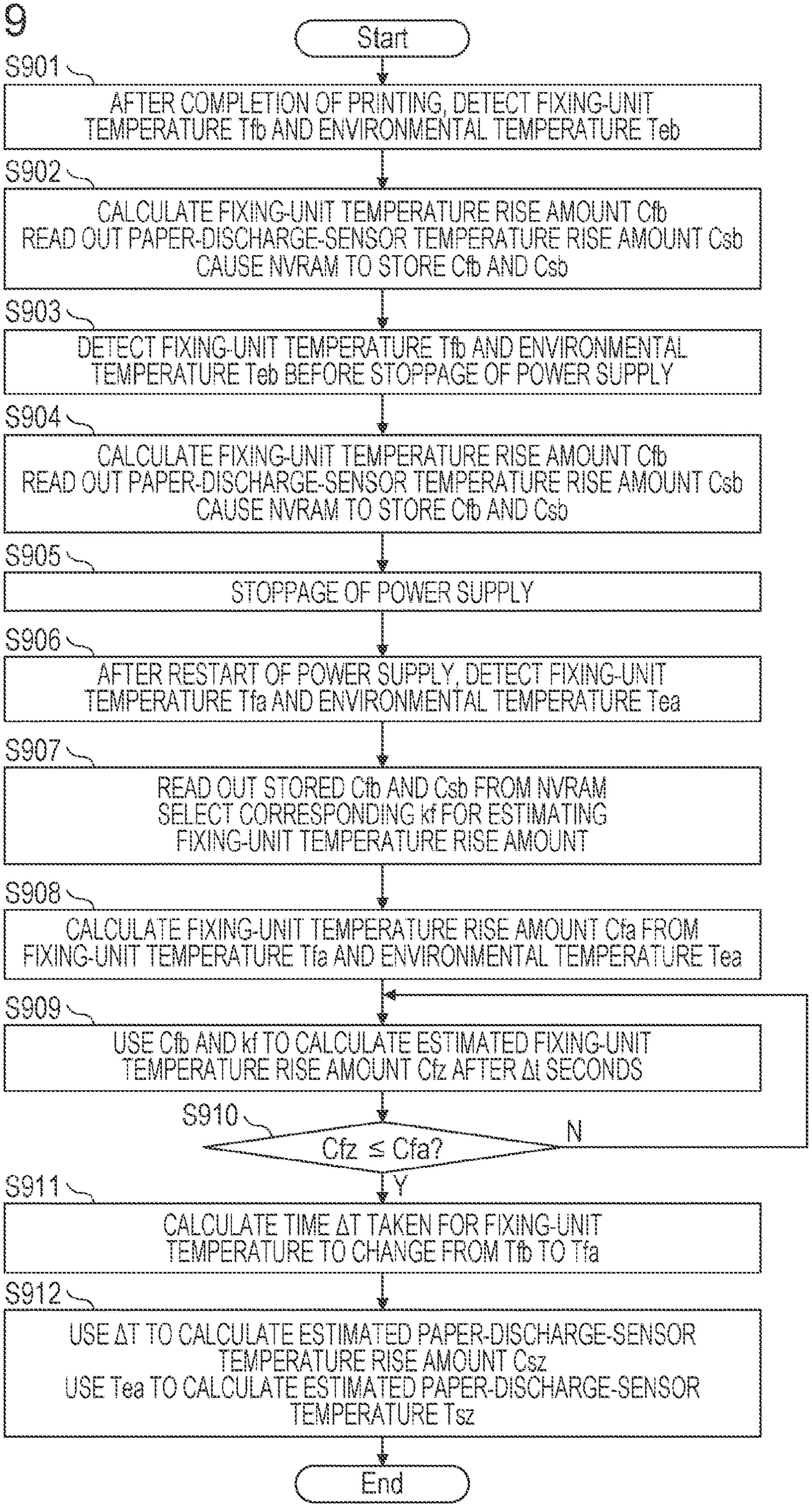
FIG. 9 is a flow chart illustrating control performed according to one or more aspects of the present disclosure.

Control in the second estimator 211*b* in the present exemplary embodiment will be described using the flow chart of FIG. 9. The flow chart illustrated in FIG. 9 is realized when the CPU 201 included in the engine controller 200 executes a program stored in the ROM 202.

In S901, after completion of printing, the second estimator 211*b* detects the fixing-unit temperature Tfb and the environmental temperature Teb using the fixing thermistor 34 and the environmental temperature sensor 37 in a respective manner.

In S902, the second estimator 211*b*, immediately after S901, calculates the fixing-unit temperature rise amount Cfb using the relationship expressed in Equation (6) and reads out a paper-discharge-sensor temperature rise amount Csb. The second estimator 211*b* causes the NVRAM 204 to store Cfb and Csb.

In S903, before stoppage of power supply, the second estimator 211*b* detects the fixing-unit temperature Tfb and the environmental temperature Teb using the fixing thermistor 34 and the environmental temperature sensor 37 in a respective manner.

In S904, the second estimator 211*b*, immediately after S903, calculates the fixing-unit temperature rise amount Cfb, which is a fixing-unit temperature rise amount before stoppage of power supply, using the relationship expressed in Equation (6) and reads out the paper-discharge-sensor temperature rise amount Csb. The second estimator 211*b* causes the NVRAM 204 to store Cfb and Csb. This is, in other words, update processing for Cfb and Csb stored in the NVRAM 204 in S902.

Note that steps S903 and S904 are repeated every predetermined time after completion of S902. This is because it is not possible to predict when power supply will be stopped. In the present exemplary embodiment, steps S903 and S904 are repeated every one minute. In a case where power supply is stopped within one minute from completion of S902, steps S903 and 904 are skipped, and the values stored in S902 in the NVRAM 204 will be used.

In S905, suppose that power supply to the image forming apparatus 100 is stopped by the user performing, for example, an operation for removing the inlet cable from the outlet or due to an event such as a power failure. In S906, after power supply to the image forming apparatus 100 is restarted by the user performing, for example, an operation for inserting the inlet cable into the outlet or due to an event such as power restoration, the second estimator 211*b* detects the fixing-unit temperature Tfa and the environmental temperature Tea in the same way as in S901.

In S907, the second estimator 211*b* reads out the paper-discharge-sensor temperature rise amount Csb stored in the NVRAM 204 and selects, on the basis of the value of Csb, a corresponding kf for estimating the fixing-unit temperature rise amount from Table 2. In S908, the second estimator 211*b* uses the fixing-unit temperature Tfa and the environmental temperature Tea detected in S906 to calculate the fixing-unit temperature rise amount Cfa, which is a fixing-unit temperature rise amount after restoration of power supply, using Equation (6).

In S909, an estimated fixing-unit temperature rise amount Cfz after a predetermined time, Δt seconds (six seconds in the present exemplary embodiment), is calculated by the second estimator 211*b* using Cfb read out and kf selected in S907 and Equations (3) to (5). In S910, in a case where Cfz calculated in S909 is less than or equal to Cfa calculated in S908, the second estimator 211*b* performs S911. In a case where Cfz is greater than Cfa in S910, the process returns to S909. The estimated fixing-unit temperature rise amount Cfz after Δt seconds is calculated again in S909, and the process proceeds to S910.

In S911, using the following Equation (10), the second estimator 211*b* calculates a time ΔT taken for the fixing-unit temperature to change from Tfb to Tfa. When n denotes the number of times the calculation is repeated in S909, ΔT is expressed as the following Equation (10).

$$\Delta T = n \cdot \Delta t \quad (10)$$

In S912, the second estimator 211*b* uses ΔT calculated in S911 and substantially the same relationships expressed in Equations (3) to (5) to calculate an estimated paper-discharge-sensor temperature rise amount Csz. The second estimator 211*b* then calculates an estimated paper-discharge-sensor temperature Tsz by using Equation (1).

In the present exemplary embodiment, since only the temperature variation coefficient kfb, which indicates temperature fall characteristics of the fixing-unit temperature rise amount Cf, is stored for each pattern of the operation history of the image forming apparatus 100, the amount of data stored in the ROM 202 can be reduced, compared in the first exemplary embodiment.

Moreover, in the present exemplary embodiment, in S912, a fixed value independent from the value of Cs is used as a temperature variation coefficient (the temperature variation coefficient of the paper discharge sensor 30) ks, which is used when Csz is calculated. This is a value that has been experimentally acquired in advance similarly to as in the case of estimation of the cartridge temperature T described in the first exemplary embodiment. In the present exemplary embodiment, similarly to as in the case of kf for estimating the fixing-unit temperature rise amount Cf, the values of ks can be held in accordance with Cs indicating the operation history of the image forming apparatus 100. This is because, regarding the internal temperature of a portion near the fixing unit 19, temperature fall characteristics may change in accordance with the operation history of the image forming apparatus 100 as in the case of the fixing unit 19. This case can also be realized by having experimentally acquired the values of ks for respective values of Cs in advance and causing the ROM 202 to store the values of ks. Similarly to as in S907, the second estimator 211*b* may select an appropriate ks value in accordance with a Cs value.

As described above, according to the present exemplary embodiment, the accuracy can be increased with which the temperatures of target portions at the time of restoration of power are estimated.

Note that one point of the above-described second exemplary embodiment is that the length of a period from the first timing before stoppage of power supply to the second timing after restart of power supply is obtained. In this case, to obtain the length of a period in which power supply is stopped, an alternative means is conceivable in which the CPU 201 installed in the engine controller 200 is caused to measure time. However, as described above, states in which power supply is stopped in the present exemplary embodiment include a state in which a power failure has occurred and a state in which the inlet cable is removed from an outlet, and thus a means cannot be used in which the CPU 201 is operated so as to measure time. Thus, the necessity to perform the method of the above-described second exemplary embodiment arises.

In contrast, in a state where a power failure has not occurred and furthermore the inlet cable is connected to an outlet, in a case where the power switch of the image forming apparatus 100 is simply turned off, the CPU 201 can be operated so as to measure time although depending on the configuration of the image forming apparatus 100. For example, in a case where the power switch uses a soft switching method, even when the power is off, power is supplied to the engine controller 200, and the CPU 201 can continue measuring time. Thus, even in the above-described first and second exemplary embodiments, in a case where the power switch is simply turned off, the CPU 201 is configured to count the length of a period until the power switch is turned on again and estimate the cartridge temperatures T in accordance with the length of the period. Note that the same applies to a case where the image forming apparatus 100 has entered the sleep mode.

However, this does not prevent application of the present disclosure to a case where the power switch is simply turned off and a case where the image forming apparatus 100 has entered the sleep mode. That is, the present disclosure may be applied not only to the case where power supply to the image forming apparatus 100 is stopped but also to, for example, a case where the image forming apparatus 100 is powered off. As a result, the CPU 201 does not have to measure time, resulting in energy conservation in the image forming apparatus 100.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-156316, filed Sep. 27, 2021, which is hereby incorporated by reference herein in its entirety.

What is claimed is:

1. An image forming apparatus configured to form an image on a recording material, the image forming apparatus comprising:

a detection unit configured to detect a temperature of a first member; and an estimation unit configured to estimate a temperature of a second member, which is different from the first member, the estimation unit including a first data group including a plurality of types of data of temperature fall characteristics regarding the first member, and data of temperature fall characteristics regarding the second member, wherein the estimation unit selects one data of temperature fall characteristics from the first data group in accordance with information representing an operation history of the image forming apparatus before a power-off period of the image forming apparatus, and wherein the estimation unit is configured to estimate the temperature of the second member at a second timing, based on the selected data of temperature fall characteristics, the data of temperature fall characteristics regarding the second member, an amount of change in the temperature of the first member during a period from a first timing, which is a timing before the power-off period of the image forming apparatus, to the second timing, which is a timing of powering on after the power-off period of the image forming apparatus, and the temperature of the second member estimated by the estimation unit at the first timing.

2. The image forming apparatus according to claim 1, wherein the estimation unit obtains the change in the temperature of the first member in the period, based on a temperature of the first member detected by the detection unit at the first timing.

3. The image forming apparatus according to claim 1 further comprising:

a storage unit in which table information is stored that indicates a correspondence relationship between data representing a temperature change characteristic of the first member and data representing a temperature change characteristic of the second member, wherein the table information contains a plurality of pieces of data representing the temperature change characteristic of the second member in accordance with information regarding the operation history of the image forming apparatus, and the estimation unit selects, based on information representing the operation history of the image forming apparatus, data to be used from among the plurality of pieces of data representing the temperature change characteristic of the second member, and estimates the temperature of the second member corresponding to the second timing, based on the selected data, the change in the temperature of the first member, and the temperature of the second member corresponding to the first timing.

4. The image forming apparatus according to claim 1 further comprising:

a memory unit in which information regarding an equation is stored that derives data representing a temperature change characteristic of the second member by using, as an argument, data representing a temperature change characteristic of the first member, wherein the information regarding the equation has a plurality of different coefficients corresponding to pieces of information representing the operation history of the image forming apparatus, and the estimation unit selects, based on information representing the operation history of the image forming apparatus, a coefficient to be used from among the plurality of coefficients, and estimates the temperature of the second member corresponding to the second timing, based on the selected coefficient, the change in the temperature of the first member, and the temperature of the second member corresponding to the first timing.

5. The image forming apparatus according to claim 4, wherein a plurality of pieces of data representing the temperature change characteristic of the second member are further stored in the memory unit, and in a case where the estimation unit estimates the temperature of the second member, the estimation unit selects, based on information representing the operation history of the image forming apparatus, data to be used from among the plurality of pieces of data representing the temperature change characteristic of the second member.

6. The image forming apparatus according to claim 4 further comprising:

a storage unit in which a plurality of pieces of data are stored that represent a temperature change characteristic of the first member and set in accordance with the operation history of the image forming apparatus, wherein the estimation unit selects, based on information representing the operation history of the image forming apparatus, data to be used from among the plurality of pieces of data representing the temperature change characteristic of the first member, and obtains, based on the selected data, a length of the period from the first timing to the second timing, and estimates the temperature of the second member corresponding to the second timing, based on the length of the period and the temperature of the second member corresponding to the first timing.

7. The image forming apparatus according to claim 1, wherein the first timing is a timing before power supply to the image forming apparatus is stopped and after a printing operation executed immediately before stoppage of power supply is complete, and the second timing is a timing after power supply to the image forming apparatus is restarted and before power supply to the first member is restarted.

8. The image forming apparatus according to claim 1, wherein information representing the operation history of the image forming apparatus is the temperature of the second member estimated by the estimation unit and corresponding to the first timing.

9. The image forming apparatus according to claim 1, wherein information representing the operation history of the image forming apparatus is a number of continuously printed pages or sheets for a job executed immediately before the image forming apparatus is powered off.

10. The image forming apparatus according to claim 1, wherein the first member is a fixing unit configured to fix an image on a recording material, and the detection unit is a thermistor configured to detect a temperature of a heater provided in the fixing unit.

11. The image forming apparatus according to claim 10, wherein the fixing unit is provided with a cylindrical film configured to rotate while being in contact with a sheet and a pressure roller configured to be in contact with an outer circumferential surface of the film, the heater and the thermistor are provided in an internal space of the film, and the heater and the pressure roller form a nip for sheet conveyance, with the film therebetween.

12. The image forming apparatus according to claim 1, wherein the second member is a cartridge that contains a developer or a discharge sensor configured to detect a recording material on which an image is formed.

13. The image forming apparatus according to claim 1, wherein the estimation unit is configured to estimate time from the first timing to the second timing, based on the selected data of temperature fall characteristics, and the amount of change in the temperature of the first member during the period from the first timing to the second timing.

14. An image forming apparatus configured to form an image on a recording material, the image forming apparatus comprising:

a detection unit configured to detect a temperature of a first member; and an estimation unit configured to estimate a temperature of a second member, which is different from the first member, the estimation unit including a first data group including a plurality of types of data of temperature fall characteristics regarding the first member, and data of temperature fall characteristics regarding the second member, wherein the estimation unit selects one data of temperature fall characteristics from the first data group in accordance with information representing an operation history of the image forming apparatus before a power-off period of the image forming apparatus, wherein the estimation unit estimates time from a first timing to a second timing, based on the selected data of temperature fall characteristics included in the first data group, and an amount of change in the temperature of the first member during a period from the first timing, which is a timing before the power-off period of the image forming apparatus, to the second timing, which is a timing of powering on after the power-off period of the image forming apparatus, and wherein the estimation unit is configured to estimate the temperature of the second member at a second timing, based on the data of temperature fall characteristics regarding the second member, the temperature of the second member estimated by the estimation unit at the first timing, and the estimated time from the first timing to the second timing.

15. The image forming apparatus according to claim 14, wherein the estimation unit obtains the change in the temperature of the first member in the period, based on a temperature of the first member detected by the detection unit at the first timing.

16. The image forming apparatus according to claim 14 further comprising:

a memory unit in which information regarding an equation is stored that derives data representing a temperature change characteristic of the second member by using, as an argument, data representing a temperature change characteristic of the first member, wherein the information regarding the equation has a plurality of different coefficients corresponding to pieces of information representing the operation history of the image forming apparatus, and the estimation unit selects, based on information representing the operation history of the image forming apparatus, a coefficient to be used from among the plurality of coefficients, and estimates the temperature of the second member corresponding to the second timing, based on the selected coefficient, the change in the temperature of the first member, and the temperature of the second member corresponding to the first timing.

17. The image forming apparatus according to claim 14, wherein the first member is a fixing unit configured to fix an image on a recording material, and the detection unit is a thermistor configured to detect a temperature of a heater provided in the fixing unit.

18. The image forming apparatus according to claim 17, wherein the fixing unit is provided with a cylindrical film configured to rotate while being in contact with a sheet and a pressure roller configured to be in contact with an outer circumferential surface of the film, the heater and the thermistor are provided in an internal space of the film, and the heater and the pressure roller form a nip for sheet conveyance, with the film therebetween.

19. The image forming apparatus according to claim 14, wherein the second member is a cartridge that contains a developer or a discharge sensor configured to detect a recording material on which an image is formed.

* * * * *